United States Patent [19]

Schnürer

[11] Patent Number: 4,477,123
[45] Date of Patent: Oct. 16, 1984

[54] HYDRAULIC BRAKE SYSTEM FOR VEHICLES

[75] Inventor: Otmar Schnürer, Gifhorn, Fed. Rep. of Germany

[73] Assignee: Volkswagenwerk AG, Wolfsburg, Fed. Rep. of Germany

[21] Appl. No.: 423,048

[22] Filed: Sep. 24, 1982

[30] Foreign Application Priority Data

Jan. 16, 1982 [DE] Fed. Rep. of Germany ....... 3201255

[51] Int. Cl.³ .......................... B60T 8/24; B60T 8/26
[52] U.S. Cl. .................................... 303/24 R; 188/349
[58] Field of Search ............... 303/24 R, 24 A, 24 B, 303/24 C, 24 F, 24 BB, 22 R, 6 R, 6 C; 188/349, 195, 181 R

[56] References Cited

U.S. PATENT DOCUMENTS

| | | | |
|---|---|---|---|
| 2,827,137 | 3/1958 | Lockheed | 188/181 R |
| 3,035,869 | 5/1962 | Francia | 303/24 R X |
| 3,529,871 | 9/1970 | Burckhardt et al. | 303/24 R X |
| 3,890,014 | 6/1975 | Hayes | 303/24 R |
| 3,917,355 | 11/1975 | Takeuchi | 303/6 C |
| 3,920,281 | 11/1975 | Brun | 303/10 X |
| 3,975,062 | 8/1976 | Giordano et al. | 303/22 R |
| 4,012,079 | 3/1977 | Takeshita | 303/6 C |
| 4,093,314 | 6/1978 | Kozakai | 303/24 F |

FOREIGN PATENT DOCUMENTS

| | | |
|---|---|---|
| 627772 | 3/1936 | Fed. Rep. of Germany . |
| 1160744 | 1/1964 | Fed. Rep. of Germany . |
| 1262802 | 3/1968 | Fed. Rep. of Germany . |
| 1555435 | 11/1969 | Fed. Rep. of Germany . |
| 1555488 | 11/1969 | Fed. Rep. of Germany . |
| 1555095 | 7/1970 | Fed. Rep. of Germany . |
| 1630405 | 4/1971 | Fed. Rep. of Germany . |
| 2855717 | 6/1979 | Fed. Rep. of Germany . |
| 1387022 | 3/1967 | France .............................. 303/24 A |
| 1165733 | 10/1969 | United Kingdom . |

Primary Examiner—Douglas C. Butler
Attorney, Agent, or Firm—Spencer & Frank

[57] ABSTRACT

A hydraulic brake system for a vehicle includes first and second brake lines communicating with first and second rear wheel brakes, respectively, for supplying hydraulic fluid under pressure thereto and first and second valves arranged in the first and second brake lines, respectively. Each valve has a deceleration and acceleration responsive movable valve member controlling, as a function of its position, the flow of hydraulic liquid through the brake line with which the movable valve member is associated and a guide track guiding the associated movable valve member with a single degree of freedom of motion. Each guide track slopes downwardly towards the vehicle rear at an angle $\alpha$ with respect to a horizontal plane and further, each guide track inclines away from the longitudinal vehicle axis outwardly towards the vehicle rear in the direction of the associated rear wheel brake at an angle $\beta$ which a vertical projection of each guide track onto a horizontal plane defines with the vehicle axis.

2 Claims, 3 Drawing Figures

HYDRAULIC BRAKE SYSTEM FOR VEHICLES

BACKGROUND OF THE INVENTION

This invention relates to a hydraulic brake system for vehicles, particularly automotive vehicles and is of the type which includes a mass inertia-actuated device for a deceleration and transverse acceleration dependent control of the braking force distribution.

Known hydraulic brake systems of the above-outlined type are technically and constructionally complex and expensive and require significant space. Further, as a rule, during brake actuation in curves, the braking pressure of the two rear wheels is reduced or limited as a function of transverse accelerations. Since this effect applies to both the inner and outer wheel in the curve, the braking forces are not utilized to the fullest extent.

Thus, German Patent No. 1,160,744 discloses a hydraulic brake system which comprises a control mass executing longitudinal and transverse excursions in a pendulum-like manner. The control mass which thus has several degrees of freedom of motion, effects, by means of a mechanical linkage system, a longitudinal and transverse acceleration-dependent braking force reduction of the rear wheel brakes relative to the front wheel brakes.

German Offenlegungsschrift (Application Published Without Examination) No. 1,555,095 discloses a hydraulic brake system which comprises a spherical control mass having several degrees of freedom, that is, the mass is movable in the longitudinal and transverse direction of the vehicle, in order to effect a longitudinal and transverse acceleration-dependent braking force reduction of the rear wheel brakes.

Further, German Offenlegungsschrift No. 1,630,405 discloses a hydraulic brake system in which the braking pressure is limited or reduced only at the inner wheel. In this known brake system, in the brake lines leading to the rear wheel brakes, there are arranged separate solenoids which are separately energized by means of a signal transmitter which responds only in a certain predetermined direction (such as a directional transverse force sensor). When the brakes are applied in curves, upon exceeding a predetermined transverse acceleration force, only that solenoid is energized which is associated with the inner rear wheel, while the solenoid arrangement in the other brake circuit (associated with the outer wheel) does not respond. Although theoretically it is readily feasible to sense deceleration and acceleration forces in the longitudinal and transverse direction of the vehicle and utilize them for generating control signals for electrically actuated valve arrangements, the use of such electronic and electric devices in a hydraulic system not only further complicates the brake system but also introduces additional sources of error.

SUMMARY OF THE INVENTION

It is an object of the invention to provide an improved hydraulic brake system of the above-outlined type in which, by using known and well proven means, a deceleration and transverse acceleration controlled braking force distribution is effected wherein the braking pressure for the two rear wheels is individually controlled so that, on the one hand, it is ensured that the inner rear wheel does not prematurely lock and, on the other hand, the outer rear wheel may participate with a large braking force in the overall braking of the vehicle.

This object and others to become apparent as the specification progresses, are accomplished by the invention, according to which, briefly stated, the hydraulic brake system includes first and second brake lines communicating with first and second rear wheel brakes, respectively, for supplying hydraulic fluid under pressure thereto and first and second valves arranged in the first and second brake lines, respectively. Each valve has a deceleration and acceleration responsive movable valve member controlling, as a function of its position, the flow of hydraulic liquid through the brake line with which the movable valve member is associated and a guide track guiding the associated movable valve member with a single degree of freedom of motion. Each guide track slopes downwardly towards the vehicle rear at an angle $\alpha$ with respect to a horizontal plane and further, each guide track inclines away from the longitudinal vehicle axis outwardly towards the vehicle rear in the direction of the associated rear wheel brake at an angle $\beta$ which a vertical projection of each guide track onto a horizontal plane defines with the vehicle axis.

In the hydraulic brake system according to the invention, with the use of conventional and well-proven braking force distributor valves in which a valve mass is movable along an inclined track with a single freedom of motion, there is achieved without additional expense that, on the one hand, the deceleration-controlled braking force distribution is maintained in the usual manner during straight-line travel and that, on the other hand, the braking pressure for the rear wheel brakes during travel in curves is, with transverse acceleration control distributed in such a manner that—compared to a system without a transverse acceleration-controlled device—the braking pressure of the inner rear wheel brake is decreased while simultaneously increasing the braking pressure of the outer rear wheel brake.

The valves used in the arrangement according to the invention may be commercially available deceleration-dependent valves as described, for example, in German Patent No. 1,262,802 or valves known as "G valves" manufactured by the firm Girling Ltd., Birmingham (Great Britain).

Particularly advantageous is the use of valves which can be additionally controlled in a load-dependent manner as described, for example, in the German Offenlegungsschriften Nos. 1,555,435, 1,555,488 and 2,855,717 or in U.S. Pat. No. 4,012,079.

DESCRIPTION OF THE PREFERRED EMBODIMENT

Figure 1:
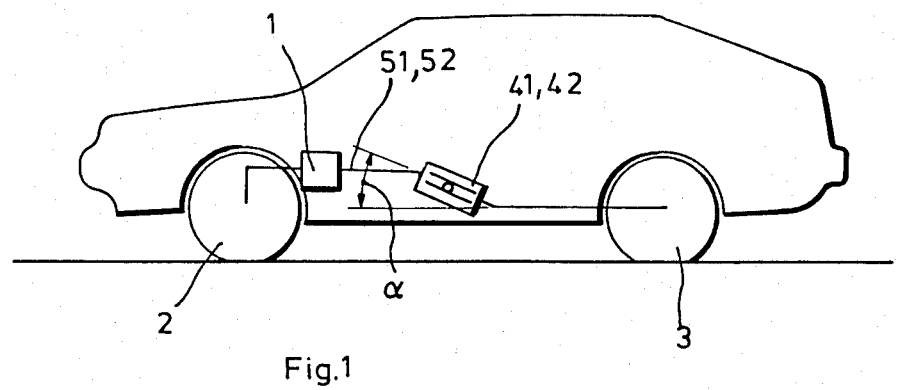
FIG. 1 is a schematic side elevational view of an automotive vehicle incorporating a hydraulic brake system according to a preferred embodiment of the invention.

Turning now to the Figures, there is illustrated a hydraulic brake system comprising two diagonally divided independent brake circuits I and II. In such an arrangement thus the two rear wheel brakes belong to different brake circuits.

The separate brake circuits I and II of the hydraulic brake system are supplied with the required braking pressure from a master cylinder 1, upon actuation of a braking pedal 7. With the aid of a mass inertia-actuated device generally designated at 4 the braking force distribution between the front wheels 2 on the one hand and the rear wheels 3 on the other hand is controlled in a deceleration-dependent and transverse acceleration-dependent manner.

The device 4 comprises a plurality of functionally independent valves 41 and 42, each of which essentially comprises a movable valve mass 411 and 421, respectively, which, under the effect of their inertia, are capable of moving only with a single degree of freedom on a respective guide track 412 or 422. The valves 41 and 42 are contained in, and control the flow passage of, respective brake lines 51 and 52 leading to respective rear wheel brakes 31 and 32. In the illustrated embodiment the rear wheel brakes 31 and 52 are pressurized solely by means of a single brake line. Accordingly, for each rear wheel brake only a sole valve 41 or, respectively 42 is provided. In case the rear wheel brakes, departing from the illustrated embodiment, are pressurized by more than a single brake line, then a corresponding number of valves are to be provided.

As shown in FIG. 1, the guide tracks 412 and 422 of the valves 41 and 42 are arranged at an angle of inclination α with respect to the horizontal plane (assuming a horizontal position of the vehicle) in such a manner that they slope downwardly in the rearward direction of the vehicle. The magnitude of α depends from the structurally desired degree of deceleration dependence.

Figure 2:
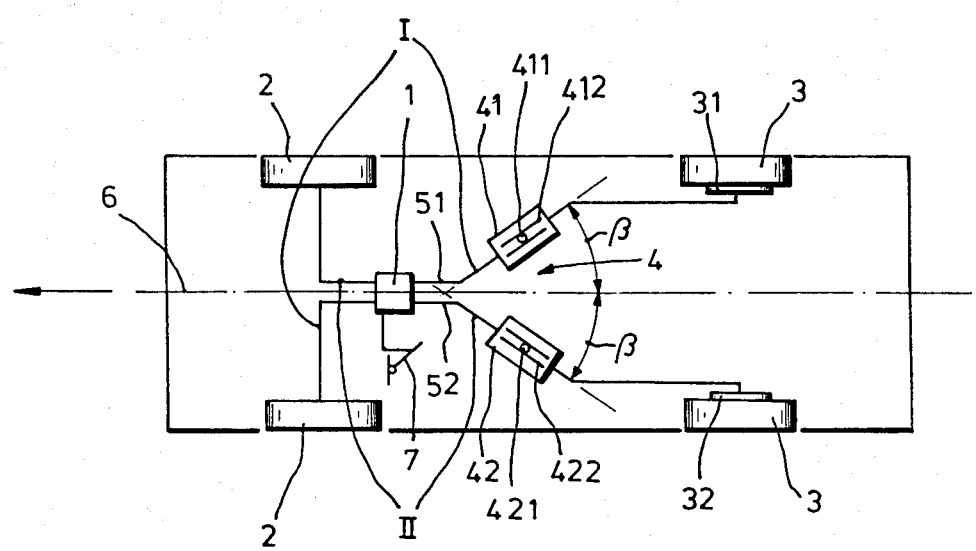
FIG. 2 is a schematic top plan view of the structure shown in FIG. 1.

As illustrated in FIG. 2, the guide tracks 412 and 422 of the two valves 41 and 42 do not extend parallel to the longitudinal vehicle axis 6. Rather, in their projection onto a horizontal plane they each define an angle β with the vehicle axis 6. The two valves 41 and 42 are arranged in such a manner that the projection of their respective guide track 412 and 422 is in each instance oriented outwardly and rearwardly towards the respective associated rear wheel brake 31 and 32.

It will be readily understood that by appropriately selecting the angles α and β the braking force distribution for both linear travel and travel in curves can be optimized. For the selected arrangement identical conditions exist for both valves 41 and 42 for straight-line travel. During braking of the vehicle, the valve masses 411 and 421 have to overcome the same track resistance so that the braking pressure applied to the two rear wheel brakes 31 and 32 during straight-line travel is controlled identically in a deceleration-dependent manner.

The above-discussed conditions for straight-line travel alter when the vehicle travels in a curve. It will be readily understood that, for example, by negotiating a right-hand curve, the valve mass 411 associated with the inner rear wheel brake 31 has to overcome a significantly lower track resistance during braking than the valve mass 421 associated with the outer rear wheel brake 32 because the guide track 412 is inclined towards the direction of the effective centrifugal force, whereas the guide track 422 is oriented thereagainst. In case of negotiating a left-hand curve the conditions are reversed.

By virtue of the above-described arrangement, during braking in curves the braking pressure of the inner rear wheel brake is decreased and simultaneously the braking pressure of the outer rear wheel brake is increased as compared, in each instance, with a deceleration-dependent control of a braking system which, however, does not depend from a transverse acceleration.

In addition to the deceleration and transverse acceleration dependent control of the braking force distribution, it is feasible in a simple manner to additionally provide load-dependent control components. For this purpose it is merely required to change the angle α of the valves 41 and 42 conventionally in a load-dependent manner, as it is described, for example, in the German Offenlegungsschriften Nos. 1,555,435; 1,555,488 and 2,855,717 or in the U.S. Pat. No. 4,012,079.

Figure 3:
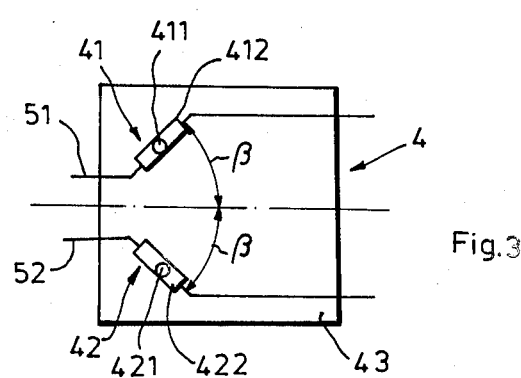
FIG. 3 is a schematic top plan view of a unitary combined valve structure.

In the embodiment illustrated in FIGS. 1 and 2 there are provided two spatially separated valves 41 and 42. Advantageously, it is feasible to provide, under preservation of their functional independence, unitary combined valve structures by arranging both valve masses 411 and 421 and both guide tracks 412 and 422 within a common valve housing 43 as illustrated schematically in FIG. 3. In such case, additional mounting advantages result because both valve units may be mounted on the vehicle chassis in a single installment step in an angularly correct orientation.

While the invention was described in connection with a two-circuit brake system, it is apparant that the invention may be applicable in brake systems independently from the number of braking circuits and it may thus find application in a single circuit brake system as well.

It will be understood that the above description of the present invention is susceptible to various modifications, changes and adaptations, and the same are intended to be comprehended within the meaning and range of equivalents of the appended claims.

What is claimed is:

1. A hydraulic brake system for a vehicle having a longitudinal axis and including first and second rear wheels situated at opposite sides of said axis, comprising
   (a) first and second rear wheel brakes mounted in said first and second rear wheels, respectively;
   (b) first and second brake lines communicating with said first and second rear wheel brakes, respectively, for supplying hydraulic fluid under pressure thereto; and
   (c) first and second valves in said first and second brake lines, respectively; said valves together forming a mass inertia actuated, deceleration and transverse acceleration controlled braking force distributing device, each said valve including
      (1) a movable valve member controlling, as a function of its position, the flow of hydraulic liquid through the brake line with which the movable valve member is associated; each movable valve member being displaceable by deceleration and acceleration forces imparted thereto as a function of the motion behavior of the vehicle; and
      (2) a guide track guiding the associated movable valve member with a single degree of freedom of motion; each guide track sloping downwardly towards the vehicle rear at an angle α with respect to a horizontal plane; each guide track inclining away from said axis outwardly towards the vehicle rear in the direction of the associated rear wheel brake at an angle β which a vertical projection of each guide track onto a horizontal plane defines with said axis.

2. A hydraulic brake system as defined in claim 1, wherein said first and second valves are combined into a single structural unit.

* * * * *